United States Patent [19]
Meske

[11] Patent Number: 6,071,320
[45] Date of Patent: Jun. 6, 2000

[54] APPARATUS FOR STARTING A LOG FIRE

[76] Inventor: Albin F. Meske, 3232 N. Interlaken Dr., Oconomowoc, Wis. 53066

[21] Appl. No.: 08/940,224

[22] Filed: Sep. 30, 1997

Related U.S. Application Data

[63] Continuation-in-part of application No. 08/731,799, Oct. 21, 1996, Pat. No. 5,697,989.

[51] Int. Cl.[7] .................................. C10L 5/44; C10L 5/00
[52] U.S. Cl. ................................ 44/532; 44/533; 44/590; 44/606
[58] Field of Search .............................. 44/532, 533, 535, 44/530, 590, 606

[56] References Cited

U.S. PATENT DOCUMENTS

| | | |
|---|---|---|
| 6,246 | 1/1849 | Husbands . |
| 86,427 | 2/1869 | Loft . |
| 135,385 | 2/1873 | Adams . |
| 154,796 | 9/1874 | Husbands . |
| 181,033 | 8/1876 | Brown . |
| 182,087 | 9/1876 | Tylee . |
| 182,287 | 9/1876 | Pond . |
| 196,596 | 10/1877 | Reed . |
| 196,918 | 10/1877 | McArthur . |
| 199,184 | 1/1878 | Case . |
| 201,184 | 3/1878 | Lewis . |
| 211,085 | 1/1879 | Burnett . |
| 248,849 | 10/1881 | Eddy . |
| 317,420 | 5/1885 | Seymour . |
| 345,928 | 7/1886 | Seymour . |
| 348,326 | 8/1886 | Johns . |
| 1,780,205 | 11/1930 | Maurel ...................................... 44/530 |
| 1,959,472 | 5/1934 | Heffernan, Jr. et al. .................. 44/530 |
| 2,578,998 | 12/1951 | Fracheboud ................................. 44/38 |
| 3,726,651 | 4/1973 | Ronden ..................................... 44/535 |
| 4,326,854 | 4/1982 | Tanner ...................................... 44/590 |
| 4,818,249 | 4/1989 | Barrett, Jr. ................................ 44/535 |
| 4,952,217 | 8/1990 | Porter ....................................... 44/532 |

OTHER PUBLICATIONS

Serial 08/731,799 (Patent No. 5,697,989 unavailable).

*Primary Examiner*—Margaret Medley
*Attorney, Agent, or Firm*—Quarles & Brady LLP; George E. Haas, Esq.

[57] ABSTRACT

An igniter for logs in a fireplace has a body of combustible material, such as wood, with two major surfaces. A plurality of grooves extend in one major surface thereby forming a plurality of ribs in the body. The grooves and ribs near the center of the body may be narrower than the grooves and ribs remote from the center. The middle section of each groove tapers toward an opening in the other major surface to form air passages through the body. The tapering of the middle sections of the groove forms relatively thin edges which ignite easily. A pair of blocks, placed on opposite sides of the slot, support the body above the fireplace hearth. By starting combustion beneath the middle openings in the grooves, a source of fire is provided that is concentrated initially into a relatively small region which gradually increases as the body is consumed.

17 Claims, 3 Drawing Sheets

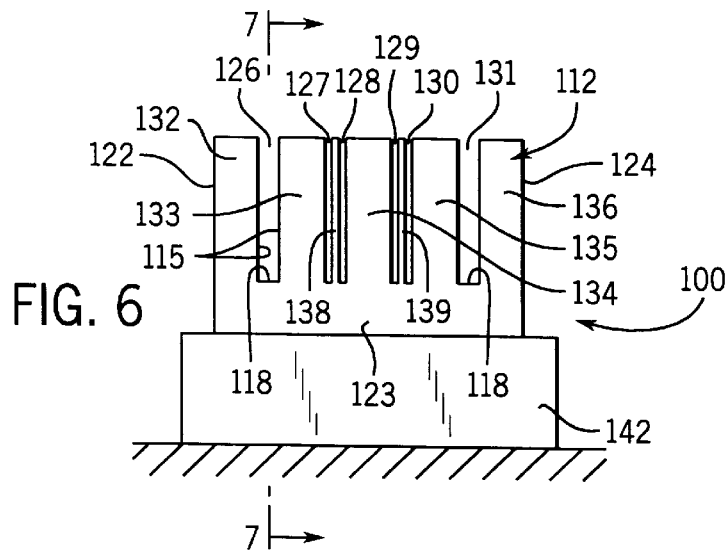
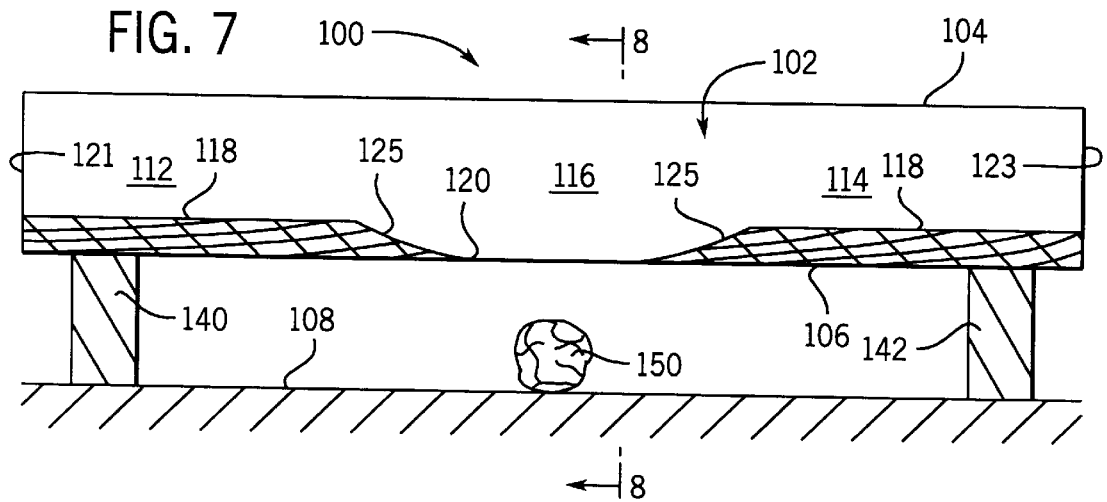
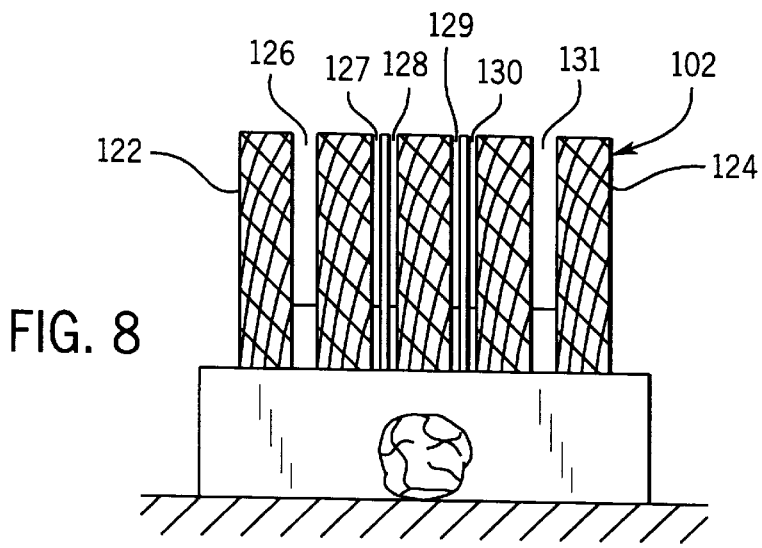

though small, 6,071,320

APPARATUS FOR STARTING A LOG FIRE

This application is a continuation-in-part of application Ser. No. 08/731,799 filed on Oct. 21, 1996 U.S. Pat. No. 5,697,989.

BACKGROUND OF THE INVENTION

The present invention relates to articles of manufacture for igniting logs, such as logs stacked in a fireplace.

When building a fire in a fireplace, logs are usually stacked on andirons which support the logs above the hearth of the fireplace. This creates a space beneath the logs in which kindling or newspaper is placed. To start the fire, the person ignites the newspaper or kindling and the initial combustion creates heat and flames which cause the logs above to catch fire. Newspaper alone usually does not provide a sustained heat source as being light weight and rapidly consumed. The flames that result from newspaper generally bypass the logs and their energy is largely wasted. When newspaper is used, a considerable amount must be placed beneath the logs as it is rapidly consumed in the initial stages of the fire. In addition, the large amount of newspaper does not provide a concentrated heat source, but rather causes an initial fire in a substantial area beneath the logs. Newspaper can be used to ignite an intermediate layer of kindling stacked beneath the logs. However, care must be taken in properly stacking the kindling in graduated order so that the most easily ignited items are at the bottom.

It has been found that better ignition of the logs occurs by concentrating the initial fire from the kindling or newspapers. However, care must be taken in properly arranging the kindling or crumpled newspaper in order to achieve such a concentrated fire source.

SUMMARY OF THE INVENTION

A general object of the present invention is to provide an engineered kindling structure for starting combustion of logs which is readily started with a small heat source, such as a rolled or folder napkin or newspaper for example.

Another object of the kindling structure is to provide a fire source which efficiently initiates combustion in logs above with minimal wasted heat at the sides and ends of the logs.

A further object of the present invention is to provide a controlled increase in the area of flame which correspondingly increases the area of log combustion with little wasted heat until the logs are ignited to their ends and the kindling process has accomplished its purpose.

Yet another object of the present invention is to provide a fire starting article having a height which can be readily adjusted for use with andirons of different heights.

These and other objects are satisfied by a manufactured fire starting article which includes a single piece body of combustible material, such as wood, that has first and second opposing major surfaces. A plurality of grooves extend in the first major surface to form a plurality of ribs in the body. Each groove has a pair of end sections with an intermediate section therebetween. The intermediate section of each of the plurality of grooves has an opening through the second major surface while the end section do not have such an opening. A support raises the body above a hearth surface.

In the preferred embodiment of the present invention, each groove has side surfaces extending inward from the first major surface and has an inner surface which extends between the side surfaces. The inner surface of each groove is spaced continuously from the second surface throughout the pair of end sections, while the inner surface in the intermediate section of each groove tapers toward the opening in the second major surface. At that opening, the inner surface of the groove meets the second major surface of the body at a relatively sharp edge.

With the body resting on the support in a fireplace beneath a pile of logs, a piece of paper or other readily combustible material can be placed under the groove openings in the second major surface of the body. When the paper is set afire, the thin edges of those openings enables the body to ignite readily and the fire progresses from those edges to thicker portions of the body. Upon ignition, flames and heat from this material travel upward through the grooves in the body. The resulting draft intensifies the fire which causes the side walls of the grooves in the body to ignite producing a concentrated source of flame and heat for the logs stacked above the fire starting article. The fire starting article ignites the center of the logs with minimal heat escaping at the sides and end of the log stack.

By the time that the central portion of the body has been consumed by the fire, the logs above will have commenced burning. Upon consumption of its central portion, the body collapses into an "M" shape beneath the logs. The burning of the body then progresses outward toward the ends at a greater rate through the grooves distributing the flames and heat over a larger area beneath the logs increasing the burning of the logs. This action provides a gradual, controlled ignition of the logs and once the logs are burning, the kindling below the burning area no longer plays a role.

DESCRIPTION OF THE DRAWINGS

FIG. 6 is an end view of the preferred embodiment of the article for starting logs on fire;

FIG. 7 is a longitudinal cross-sectional view along line 7—7 of FIG. 6; and

FIG. 8 is a cross-sectional view along line 8—8 of FIG. 7.

DETAILED DESCRIPTION OF THE INVENTION

Figure 1:
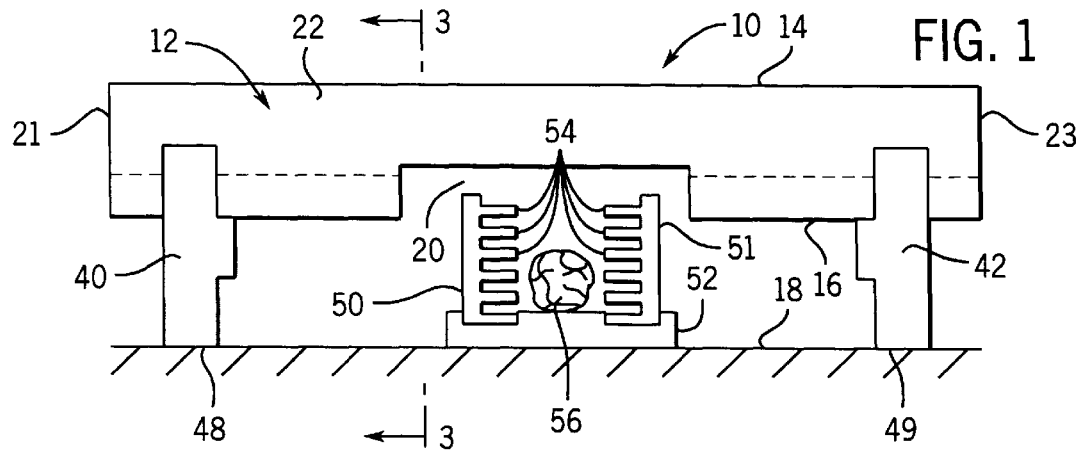
FIG. 1 is a side view of one embodiment of the present article for starting log on fire.
Figure 2:
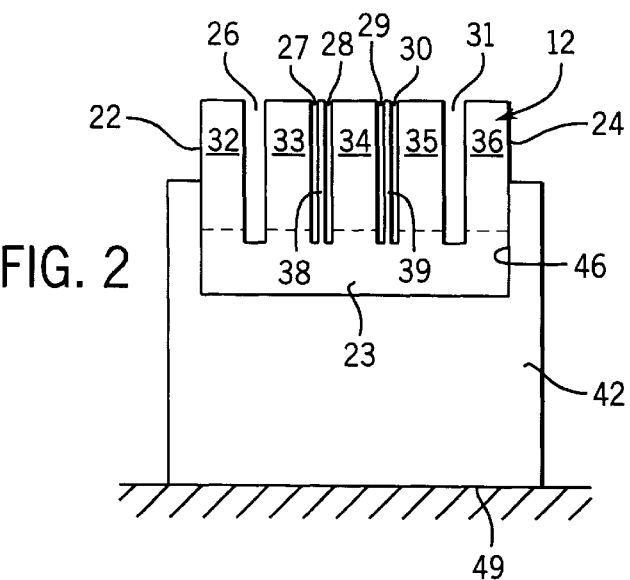
FIG. 2 is an end view of the fire starting article.
Figure 3:
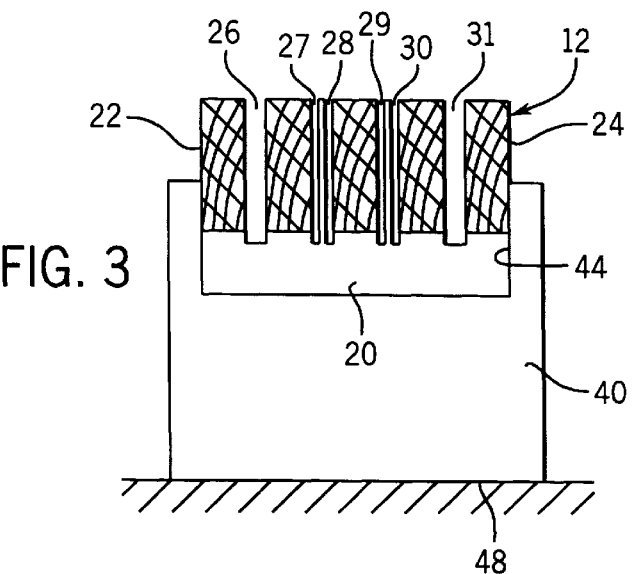
FIG. 3 is a cross-sectional view taken along Line 3—3 of FIG. 1.

With initial reference to FIGS. 1–3, a first embodiment of a fire starting article 10 comprises a body 12, of wood or similar combustible material. The body 12 has a first and second opposed major surface 14 and 16, which constitute upper and lower surfaces when positioned for use. The body also has four side walls 21, 22, 23 and 24 extending between the two major surfaces 14 and 16 (FIGS. 1 and 2). For example, the rectangular body 12 may be three inches wide, twelve inches long and two inches high.

A plurality of grooves 26–31 are formed in the first major surface 14 and extend between the opposite side walls 21 and 23. The grooves may be cut using a gang saw having a series of blades with thicknesses and spacings corresponding to the grooves, for example. The depth of the grooves 26–31 is sufficient to allow enough solid material to remain at the bottom to hold the article together and withstand the required manufacturing and handling operations. For example, the remaining material may be one-half an inch thick. The number of grooves provided can vary. In addition the width of the grooves 26–31 may vary in order to regulate the intensity of the fire produced within the grooves by controlling the air available to consume the wooden side walls of each groove. The grooves form a plurality of relatively thick ribs 32, 33, 34, 35 and 36 in the upper portion of the body 12. Depending upon the burning characteristics of the particular type of wood of body 12, the central grooves may also include pairs of smaller grooves 27 and 28, and 29 and 30 with a very thin rib 38 and 39 therebetween, as shown in FIG. 3. The relatively small thickness of ribs 38 and 39, causes them to ignite before the larger outer ribs 26 and 31, thereby creating an initial burning that is centrally concentrated in the body, as will be described.

A slot 20 is formed in the second major body surface 16 between opposing side walls 22 and 24 so as to ex-end orthogonally with respect to the direction of the plurality of grooves 26–31. The slot 20 is cut to a depth that is slightly greater than 25 percent of the distance between the two opposing major surfaces 14 and 16 thereby communicating with the plurality of grooves 26–31 as shown in FIG. 3. This communication between the slot 20 and the plurality of grooves 26–31 provides passages for combustion air to flow upward through the body 12. More than one slot may be used for longer blocks needed for larger logs in large fireplaces, for example.

Figure 5:
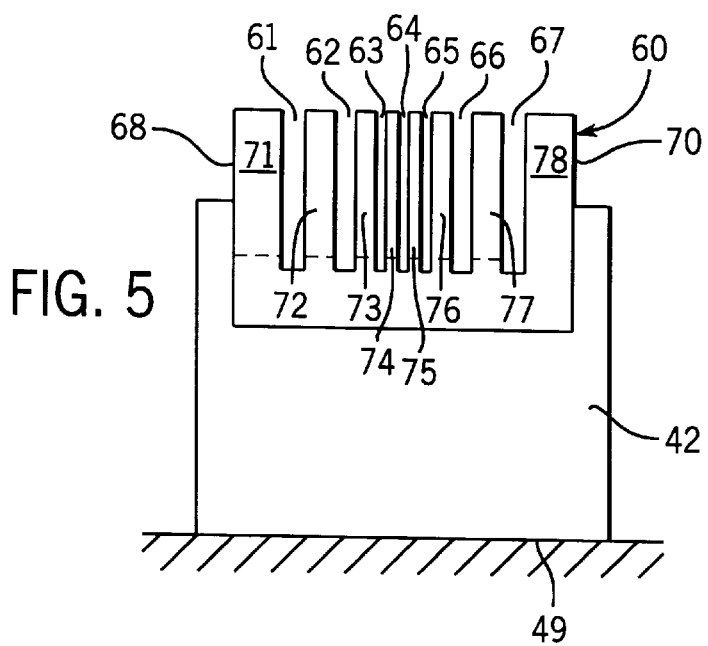
FIG. 5 is an end view of an alternative embodiment of the fire starting article.

FIG. 5 illustrates an alternative version of the body 60 in which the width of the grooves 61–66 decreases going inward from the opposing sides 68 and 70. Correspondingly, the widths of the ribs 71–78 formed between the grooves 61–67 also decrease going inward from the opposing sides 68 and 70. As will be described, the relatively thin ribs 74, 75 and 76 in the central region of the body 60 ignite faster and before the larger outer ribs 71 and 78. This concentrates the initial combustion into the central portion of the wood body 60.

Referring again to FIGS. 1–3, the fire starting article 10 is supported above a hearth surface 18 by two support blocks 40 and 42 which are beneath the second major surface 16 of the body 12 on opposite sides of the slot 20. It should be understood that the fire starting article 10 can be provided to the user in an unassembled state and prior to use the user places the body 12 on each of the support blocks 40 and 42. As shown in FIGS. 2 and 3, each of the support blocks 40 and 42 has a notch 44 or 46, respectively, within which the body 12 is received. The support blocks 40 and 42 raise the body 12 above the hearth surface 18 so that the upper major surface 14 is closely spaced (approximately 1½ inches for example) from the underside of the logs (not shown) which are stacked on andirons above the fire starting article 10 on the hearth surface 18. In order to accommodate andirons of different heights, the support blocks 40 and 42 can be inverted with the notches 44 and 46 facing the hearth surface 18. In this orientation, the opposite ends 48 and 49 of the support blocks contact with the bottom, or second surface 16 of the body 12 so as to raise the body higher off of the hearth surface 18.

As shown in FIG. 1, a pair of identical kindling blocks 50 and 51 can be placed on the hearth surface 18, or raised slightly there above by a plate 52, beneath the slot 20 in body 12. Each kindling block 50 and 51 has a plurality of horizontally extending ribs 54 which face each other and provide relatively thin pieces of wood with large surface areas which readily ignite to produce ignition of the ribs 26–31 on body 12, as will be described.

Although the present invention is being described in the context of igniting logs supported by andirons in a fireplace having a hearth surface, the present invention also may be utilized to ignite logs and other materials in different settings, such as for a campfire.

In order to ignite logs supported by andirons in a fireplace, the fire staring article 10 as shown in FIG. 1 is placed beneath the logs. A ball of paper, such as a napkin, or other combustible material is placed under the slot 20 and between the pair of kindling blocks 50 and 51, if those optional blocks are used. The paper ball 56 then is ignited with a match or a lighter and begins burning. The heat and flames from the paper ball 56 cause the tips of horizontally extending ribs 54 on the kindling blocks 50 and 51 to commence burning. Although it is preferred to use the kindling blocks 50 and 51, it is possible to eliminate them and use a larger ball 56 of paper beneath the slot 20. As the kindling blocks 50 and 51 begin burning, the flames and heat flow upward into the slot 20 and through the central portion of the plurality of grooves 26–31 in the wood body. Combustion air is drawn under the body 12 and flows upward through the slots and this central portion of the plurality of grooves. The fire grows rapidly creating a bed of flames the width of the body 12 and the size of the region of communication between the slot 20 and the transversely extending grooves 26–31.

The close spacing between the kindling blocks 50 and 51 concentrates the flames and heat which radiate upward through the body 12 in a relatively small area. This action causes the relatively small ribs 38 and 39 of the block 12 to ignite which aid in transferring the combustion to the adjacent larger ribs 33, 34 and 35. The conflagration progresses so that all of the ribs 32–39 of the body 12 ignite.

The slot 20 confines the fire to the central portion of the starter article 10 thereby concentrating heat and flames into a relatively small area under the logs and restricts the heat from escaping around the sides and ends of the log pile. Very little burning takes place at the front and rear side surfaces 22 and 24 of the body 12 until the interior of the slot 20 has widened significantly.

Figure 4:
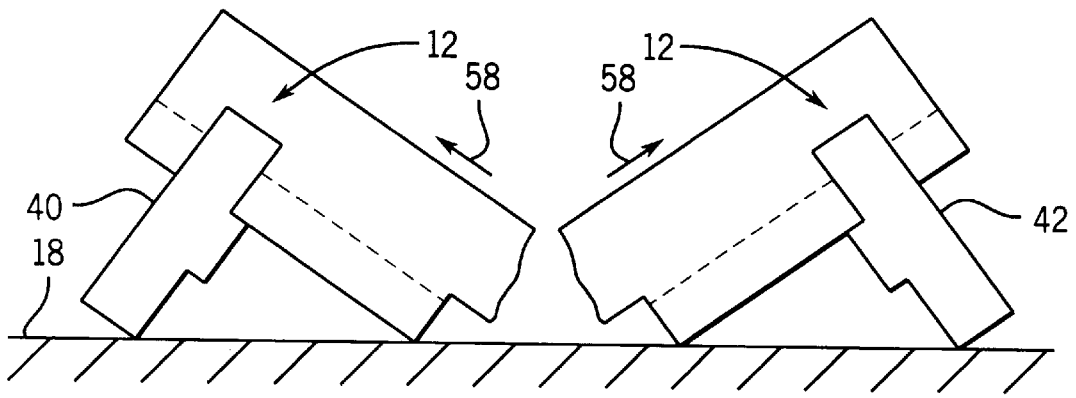
FIG. 4 is a side view of the fire starting article at a time at which fire has consumed the central portion of the article.

As the burning progresses, the intensity spreads outward in both directions from the center toward the various side walls 21–24 of the body 12. Eventually, the central portion of the body 12 burns through which divides the body 12 in two causing the central portion to drop downward onto the hearth surface 18 and the remnants of the kindling blocks 50 and 51, as shown in FIG. 4. Thereafter, the grooves 26–31 channel the combustion exhaust gases along directions indicated by arrows 58 upward through the divided sections of the body 12 which distributes the heat and flames over a greater portion of the body spreading the fire. This spreading of the fire also distributes the flames and heat over a larger area beneath the logs stacked above thereby widening conflagration of the logs.

Therefore, the present fire starting article 10 initially provides a concentrated ignition source to commence burning of the log pile and thereafter provides a controlled spreading of the flames to enlarge the combustion of the log pile.

With reference to FIGS. 6–8, a preferred embodiment of a fire starting article 100 comprises a body 102, of wood or similar combustible material. The body 102 has a first and second opposed major surface 104 and 106, which constitute upper and lower surfaces when positioned for use. The body also has four side walls 121, 122, 123 and 124 extending between the two major surfaces 104 and 106.

A plurality of grooves 126–131 are formed in the first major surface 104 and extend between the opposite side walls 121 and 123. For example, the grooves 126–131 may be cut using a gang saw having a series of blades with thicknesses and spacings corresponding to the grooves. The depths of the grooves 126–131 at side walls 121 and 123 are approximately 75 percent of the distance between the first and second major surfaces 104 and 106. The number of grooves provided and their depths can vary from that shown. The width of grooves 126–131 also may vary in order to regulate the intensity of the fire produced within the grooves by controlling the air available to consume the wooden side walls of each groove.

The grooves 126–131 form a plurality of relatively thick ribs 132, 133, 134, 135 and 136 in the upper portion of the body 102. Depending upon the burning characteristics of the particular type of wood the constitutes body 102, the central grooves may also include pairs of smaller grooves 127 and 128, and 129 and 130 with a very thin rib 138 or 139 therebetween, as shown in FIG. 6. The relatively small thickness of ribs 138 and 139, causes them to ignite before the larger outer ribs 126 and 131, thereby creating an initial burning that is centrally concentrated in the body 102, as will be described.

As shown in FIG. 7, each groove has end sections 112 and 114 adjacent the side surfaces 122 and 123, respectively, and an intermediate section 116 of the groove is between the end sections 112 and 114. Each groove 126–131 is formed by a pair of spaced apart side surfaces 115 which extend inward from the first major surface 104 and by an inner surface 118 that extends between the side surfaces. The inner surface 118 is spaced continuously from the second major surface 106, i.e. there are no openings of the grooves 126–131 through the second major surface in the end sections 112 and 114. The intermediate section 116 at the middle of each groove 126–131 extends downward and opens through the second major surface 106. This forms an opening 120 which is readily achieved by plunging the gang saw downward at the mid-point between the side surfaces 121 and 123. This method provides tapered portions 125 of the inner surface 118 of each groove on each side of the opening 120. Such tapering forms very thin edges at the opening 120 where the inner surface 118 of each groove 126–131 meets the second surface 106 at an acute angle. The material of the body 102 has minimal thickness at these opening edges which aids in starting the material on fire, as will be described. The opening 120 of the grooves 126–131 through the second surface 106 also provides passages for combustion air to flow upward through the body 102.

The fire starting article 100 is supported above a hearth surface 108 by two support blocks 140 and 142 which are beneath the second major surface 106 of the body 102 on opposite sides of the opening 120. It should be understood that the fire starting article 100 can be provided to the user in an unassembled state and prior to use the user places the body 102 on each of the support blocks 140 and 142. The support blocks 140 and 142 raise the body 102 above the hearth surface 108 so that upper major surface 104 is closely spaced (approximately 1½ inches for example) from the underside of the logs (not shown) which are stacked on andirons above the fire starting article. The support blocks 140 and 142 may have notches, such as notches 44 and 46 shown for support blocks 40 and 42 in FIGS. 1–3. In addition, a pair of kindling blocks 50 and 51, as shown in FIGS. 1–3, can be placed on the hearth surface 108 beneath the opening 120 in the body 102.

In order to ignite logs supported by andirons in a fireplace, the fire staring article 100 as shown in FIG. 7 is placed beneath the logs. A ball of paper 150 or other readily flammable material is placed under the opening 120. The paper ball 150 then is ignited with a match or a lighter and begins burning. The heat and flames from the paper ball 150 cause the edges of the tapered walls 125 at opening 120 to commence burning. The fineness of edges 120 produced by the plunge of the gang saw reduces the amount of material needed to commence burning and makes the kindling blocks 50 and 51 in FIG. 1 unnecessary, as well as eliminating the need for a cross slot 20 in the first embodiment of FIG. 1. As those edges begin burning, the flames and heat flow upward through the central portion of the plurality of grooves 126–131 in the wood body 102. Combustion air is drawn under the body 102 and flows upward through the opening 120 and the middle section of those grooves. The fire grows rapidly creating a bed of flames the width of the body 102 and the size of the region of the openings 120 in the grooves 126–131.

The flames and heat which radiate upward through the body 102 are concentrated in this relatively small region. This action causes the smaller ribs 138 and 139 to ignite which aids in transferring the combustion to the adjacent larger ribs 133, 134 and 135. The conflagration progresses so that all of the ribs 132–139 of the body 102 ignite.

The second surface opening 120 confines the fire to the central portion of the starter article 100 thereby concentrating heat and flames into a relatively small area under the logs and restricts the heat from escaping around the sides of the logs pile. Very little burning takes place at the front and rear side surfaces 122 and 124 of the body 102 until the opening 120 has widened significantly.

As the burning progresses, the intensity spreads outward in both directions from the center toward the side walls 122 and 123. Eventually, the central portion of the body 102 burns through which divides the body in two causing the central portion to drop downward onto the hearth surface 108 in a similar manner to the previous embodiment illustrated in FIG. 4. Thereafter, the grooves 126–131 channel the combustion exhaust gases upward through the divided sections of the body 102 which distributes the heat and flames over a greater portion of the body spreading the fire. This spreading of the fire also distributes the flames and heat over a larger area beneath the logs stacked above thereby widening the conflagration of the logs.

The present fire starting article 100 initially provides a concentrated ignition source to commence burning of the log pile and thereafter provides a controlled spreading of the flames to enlarge the combustion of the log pile.

The foregoing description is directed primarily to preferred embodiments of the invention. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure

What is claimed is:

1. An article for starting a fire, said article comprising:
 a body formed by a single piece of combustible material having first and second major surfaces opposite to one another, four side walls that extend between the first and second major surfaces, and a plurality of grooves extending in the first major surface to form a plurality of ribs in the body, each of the plurality of grooves having a pair of end sections with an intermediate section therebetween, only the intermediate section of each of the plurality of grooves opening through the second major surface; and a support for holding the body above a support surface.

2. The article as recited in claim 1 wherein the intermediate section of each of the plurality of grooves tapers toward an opening of the plurality of grooves through the second major surface.

3. The article as recited in claim 1 wherein the intermediate section of each of the plurality of grooves has an inner surface which tapers to meet the second major surface at an acute angle.

4. The article as recited in claim 1 wherein the end sections of each of the plurality of grooves are spiced from the second major surface of the body; and the intermediate section being tapered in a manner that reduces a spacing between each of the plurality of grooves and the second surface.

5. The article as recited in claim 1 wherein one of the plurality of grooves near a center of the body is narrower than one of the plurality of grooves that is remote from the center of the body.

6. The article as recited in claim 1 wherein one of the plurality of ribs near a center of the body is narrower than one of the plurality of ribs that is remote from the center of the body.

7. The article as recited in claim 1 wherein the support comprises a pair of blocks for resting on the support surface, and upon which pair of block the body rests.

8. The article as recited in claim 7 wherein each of the plurality of grooves opens through the second major surface between the pair of blocks.

9. The article as recited in claim 7 wherein each one of the pair of blocks has a notch therein for receiving the body.

10. The article as recited in claim 1 wherein the support comprises a pair of blocks for resting on the support surface with a different one of the pair of blocks contacting the second major surface of the body under the end sections of the plurality of grooves.

11. The article as recited in claim 1 further comprising a kindling block placed under the slot in the body and having a surface with a plurality of notches.

12. An article for starting a fire, said article comprising:

a body formed by a single piece of combustible material having first and second major surfaces opposite to ones another, four side walls that extend between the first and second major surfaces, and a plurality of grooves each one having side surfaces extending inward from the first major surface to form a plurality of ribs in the body and having an inner surface extending between the side surfaces, each of the plurality of grooves having a pair of end sections with an intermediate section therebetween, the inner surface being spaced continuously from the second surface throughout the pair of end sections and the inner surface in the intermediate section of each of the plurality of grooves tapering toward an opening in the second major surface; and a support for holding the body above a support surface.

13. The article as recited in claim 12 wherein one of the plurality of grooves near a center of the body is narrower than one of the plurality of grooves that is remote from the center of the body.

14. The article as recited in claim 12 wherein one of the plurality of ribs near a center of the body is narrower than one of the plurality of ribs that is remote from the center of the body.

15. The article as recited in claim 12 wherein the support comprises a pair of blocks for resting on the support surface with a different one of the pair of blocks contacting the second major surface of the body under the end sections of the plurality of grooves.

16. The article as recited in claim 13 wherein each of the pair of blocks has a notch therein for receiving the body.

17. The article recited in claim 12 further comprising a kindling block placed under the opening in the body and having a surface with a plurality of notches.

* * * * *